United States Patent
Lobo et al.

(10) Patent No.: US 10,003,813 B2
(45) Date of Patent: Jun. 19, 2018

(54) METHOD AND SYSTEM FOR DECODING BY ENABLING OPTIMAL PICTURE BUFFER MANAGEMENT (71) Applicant: SAMSUNG ELECTRONICS CO., LTD., Suwon-si (KR)

(72) Inventors: Austin Lobo, Bangalore (IN); Mohammed Quaid Damudi, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 14/749,752

(22) Filed: Jun. 25, 2015

(65) Prior Publication Data

US 2016/0381372 A1    Dec. 29, 2016

(51) Int. Cl.
H04N 19/44 (2014.01)
H04N 19/423 (2014.01)
H04N 19/436 (2014.01)

(52) U.S. Cl.
CPC .......... H04N 19/44 (2014.11); H04N 19/423 (2014.11); H04N 19/436 (2014.11)

(58) Field of Classification Search
CPC ..... H04N 19/44; H04N 19/423; H04N 19/436
USPC .................................................... 375/240.25
See application file for complete search history.

(56) References Cited

U.S. PATENT DOCUMENTS

| 5,949,441 | A | 9/1999 | Ristau |
| 7,221,803 | B2 | 5/2007 | Kadono et al. |
| 8,223,849 | B2 | 7/2012 | Lu et al. |
| 2008/0002773 | A1* | 1/2008 | Lai .......................... H04N 19/61 375/240.16 |
| 2008/0122922 | A1* | 5/2008 | Geng ............... G08B 13/19628 348/39 |
| 2013/0003864 | A1* | 1/2013 | Sullivan ................ H04N 19/44 375/240.25 |
| 2013/0235927 | A1 | 9/2013 | Win et al. |
| 2013/0243100 | A1* | 9/2013 | Liu ..................... H04N 19/105 375/240.25 |
| 2013/0279589 | A1 | 10/2013 | Gu et al. |
| 2014/0086336 | A1* | 3/2014 | Wang ..................... H04N 19/70 375/240.26 |
| 2014/0169449 | A1 | 6/2014 | Samuelsson et al. |
| 2014/0192895 | A1 | 7/2014 | Chen et al. |

* cited by examiner

Primary Examiner — Jay Patel
Assistant Examiner — Salame Amr
(74) Attorney, Agent, or Firm — Sughrue Mion, PLLC (57) ABSTRACT A method and system for video decoding by enabling optimal picture buffer management are provided. The method includes checking, by an application module, one or more picture buffers in a Decoder Reference Buffer (DRB) register and a Decoder Display Buffer (DDB) register received from a video decoder module, initiating at least one action based on a status of the one or more picture buffers, providing, by the application module to a video decoder module, information on at least one of the one or more picture buffers that is free, selecting, by the video decoder module, a picture buffer based on the information of the at least one of the one more picture buffers received from the application module, decoding a bit stream by using the selected picture buffer, and storing output video data from the decoding into the selected picture buffer.

17 Claims, 6 Drawing Sheets

METHOD AND SYSTEM FOR DECODING BY ENABLING OPTIMAL PICTURE BUFFER MANAGEMENT

FIELD

Exemplary embodiments generally relate to video coding. Exemplary embodiments more particularly relate to two way communication between an application and a video decoding device for optimal picture buffer management.

BACKGROUND

Digital video streams comprise a plurality of video frames which are to be displayed in sequence. Generally, the higher the quality of the video streams, the greater the size, in bytes, of the corresponding video stream. In order to reduce the required transmission bandwidth or the required storage space, video streams are compressed according to different compression standards.

Video coding is used to compress video data in both temporal and spatial domains. There are several existing video coding standards and research is ongoing for new video coding standards. These standards offer various methods and tools to provide effective video compression. In video coding more than one picture buffer is needed for the video coding device to take advantage of temporal prediction using previous pictures. Since pictures are coded out of order and multiple reference frames are used in the latest video coding standards, the video coding device should buffer the picture buffers and only send it to the application for display according to the rules set in the video coding standards for a particular video format. Generally, the memory used for the picture buffers can be large when supporting high resolutions like high definition (HD) and ultra-high definition (UHD), especially in the latest video coding standards such as H.264, HEVC etc.

The existing video coding techniques do not address the problem of optimal usage of a picture buffer's memory by the picture buffer so that the memory is used only if it is necessary. The existing video coding techniques also do not address parallelizing post processing operation for the picture buffers, which are decoded but not displayed. Further, the existing video coding techniques do not address reusing a picture buffer for the post processing operation.

In view of the foregoing, there is a need for a solution that addresses the above mentioned drawbacks and provides two way communication between the application and the video coding device which will aid in optimally making use of the memory resources.

The above mentioned shortcomings, disadvantages and problems are addressed herein as will be understood by reading and studying the following specification.

SUMMARY

Exemplary embodiments relate to a method of two way communication between an application module and the video coding device which will aid in optimally making use of memory resources.

According to an aspect of an exemplary embodiment, a method of video decoding is provided. The method includes checking, by an application module, one or more picture buffers in a Decoder Reference Buffer (DRB) register and a Decoder Display Buffer (DDB) register received from a video decoder module, initiating at least one action based on a status of the one or more picture buffers, providing, by the application module to a video decoder module, information on at least one of the one or more picture buffers that is free, selecting, by the video decoder module, a picture buffer based on the information of the at least one of the one more picture buffers received from the application module, decoding a bit stream by using the selected picture buffer, and storing output video data from the decoding into the selected picture buffer.

The initiating the at least one action based on the picture buffer status may include adding a picture buffer of the one or more picture buffers to a free buffer list, if a bit corresponding to the picture buffer is not set in the DRB register or DDB register or initiating a parallel processing application if one or more new picture frames are present in the DDB register.

The method may further include checking markings of the bit stream, removing one or more pictures from a reference picture list and move the one or more pictures to a display list, if the markings of the bit stream mark reference frames as non-reference frames, checking at least one of the reference picture list and the display picture list, updating the DRB register and the DDB register if there is a change in a marking of at least one of the reference picture list and the display picture list, and sharing the updated DRB register, the updated DDB register, and decoded information with the application module.

The method may further include communicating, by the application, information on at least one of the one or more picture buffers, in which a parallel processing operation is completed out of order, to the video decoder module through an Available Picture Buffer (APB) register; removing the at least one of the one or more picture buffers whose parallel processing is completed out of order from a reference picture list of pictures which are decoded but not displayed; tracking the at least one of the one or more picture buffers whose parallel processing is completed out of order; and sending the at least one of the one or more picture buffers whose parallel processing is completed out of order to a display when the decoder signals the at least one of the one or more picture buffers.

The checking the one or more picture buffers may include determining if at least one bit corresponding to a picture buffer of the one or more picture buffers is set in the DRB register or DDB register; and in response to determining that the at least one bit corresponding to the picture buffer of the one or more picture buffers is not set in the DRB register or the DDB register, adding the picture buffer to a free buffer list.

The checking may further include determining if a new frame is added to the DDB register; and in response to determining that the new frame is added to the DDB register, initiating a parallel processing operation.

The parallel processing operation may include post processing the new frame in response to determining the new frame is added to the DDB register and is not present in the DRB register and the method may further include storing the output of the post processing operation in a buffer where the new frame is.

The DRB register may be configured to indicate the picture buffers locked by the video decoder module to the application module, and if a bit is set in the DRB register, a corresponding buffer is locked for reference by the video decoder module.

The DRB register may be configured to indicate picture buffers locked by the video decoder module to the application module, and a set status of the bit in the DDB register indicates that a corresponding picture buffer is decoded but not provided to a display list.

According to an aspect of another exemplary embodiment, a system is provided. The system includes: a host device including an application module configured to check one or more picture buffers in a Decoder Reference Buffer (DRB) register and a Decoder Display Buffer (DDB) register received from a video decoder module, initiate at least one action based on a status of the one or more picture buffers, provide information on at least one of the one or more picture buffers that is free to the video decoder module; and a video decoder device including a video decoder module configured to select a picture buffer based on the information of the at least one of the one more picture buffers received from the application module and decode a bit stream by using the selected picture buffer.

The application module may be further configured to initiate the at least one action based on the status of the one or more picture buffers by adding a picture buffer of the one or more picture buffers to a free buffer list, if a bit corresponding to the picture buffer is not set in the DRB register or DDB register; and initiating a parallel processing application if one or more new picture frames are present in the DDB register.

The video decoder module may be configured to store output video data from the decoded bitstream into the selected picture buffer.

The video decoder device may further include a picture buffer management module configured to check markings of the bitstream, remove one or more pictures from a reference picture list and move the one or more pictures to a display list, if the markings of the bit stream marks reference frames as non-reference frames, check at least one of the reference picture list and the display picture list, update the DRB register and the DDB register if there is a change in a marking of at least one of the reference picture list and the display picture list, and share the updated the DRB register, the updated DDB register, and decoded information with the application module.

The application module may be further configured to communicate the information on at least one of the one or more picture buffers, in which a parallel processing operation is completed out of order, to the video decoder module through an Available Picture Buffer (APB) register; remove at least one of the one or more picture buffers whose parallel processing is completed out of order from a reference picture list of pictures which are decoded but not displayed; track the at least one of the one or more picture buffers whose parallel processing is completed out of order; and sending the at least one of the one or more picture buffers whose parallel processing is completed out of order to a display when the video decoder module signals the at least one of the one or more picture buffers.

The application module may be further configured to determine if at least one bit corresponding to a picture buffer of the one or more picture buffers is set in the DRB register or DDB register; in response to determining that the at least one bit corresponding to the picture buffer of the one or more picture buffers is not set in the DRB register or the DDB register, add the picture buffer to a free buffer list, determine if a new frame is added to the DDB register; and in response to determining that the new frame is added to the DDB register, initiate a parallel processing operation.

The parallel processing operation may include post processing the new frame in response to determining the new frame is added to the DDB register and is not present in the DRB register, and the application module may be further configured to store the output of the post processing operation in a buffer where the new frame is present.

The DRB register may be configured to indicate the picture buffers locked by the video decoder module to the application module, wherein if a bit is set in the DRB register, a corresponding picture buffer status is locked for reference by the video decoder module.

The DRB register may be configured to indicate picture buffers locked by the video decoder module to the application module, wherein a set status of the bit in the DDB register indicates that a corresponding picture buffer is decoded but not provided to a display list According to an exemplary embodiment herein, the term 'out of order' is used in video coding typically when the encoding is performed out of order, where the encoding order and the display order is different. In this context, the term 'out of order' is used to specify that the parallel processing operation is not performed in the display order. The exemplary embodiments herein allow parallel post processing for pictures which are not yet sent for display by the decoder.

Exemplary embodiments disclose optimal usage of picture buffers memory by making the host application picture buffer aware, i.e., the host application will allocate or provide picture buffer only when necessary. Each picture buffer size may be about 3 MB for full HD, 12 MB for 2160 p UHD, and 48 MB for 4320p UHD for a 4:2:0 8 bit formats. The picture buffer sizes for the mentioned resolutions increase considerably for a higher precision range such as 4:2:2, 4:4:4 formats and/or for 10 bits or 12 bit format. Exemplary embodiments further disclose parallelizing post processing operations for picture buffers which are decoded, but not displayed, thereby efficiently utilizing post processor by reducing an idle period. Exemplary embodiments may be used in codecs such as, but not limited to, H.264, HEVC, and the like that have non sequential output frames. Exemplary embodiments further disclose the optimal usage of a picture buffer by reusing the picture buffer for post processing operation such as deblocking, deringing and the like, by making reuse of the picture buffers which are not used as a reference.

These and other aspects of the exemplary embodiments herein will be better appreciated and understood when considered in conjunction with the following description and the accompanying drawings. It should be understood, however, that the following descriptions, while indicating exemplary embodiments and numerous specific details thereof, are presented for the purpose of illustration and not of limitation. Many changes and modifications may be made within the scope of the exemplary embodiments without departing from the inventive concept, and the exemplary embodiments herein include all such modifications.

BRIEF DESCRIPTION OF THE DRAWINGS

The other objects, features and advantages will occur to those skilled in the art from the following description of the exemplary embodiments and the accompanying drawings in which.

Although specific features of the exemplary embodiments are shown in some drawings and not in others, this is done for convenience only as each feature may be combined with any or all of the other features in accordance with the exemplary embodiments.

DETAILED DESCRIPTION OF THE EXEMPLARY EMBODIMENTS

The various exemplary embodiments relate to a method of two way communication between an application and a video coding device which will aid in optimally making use of memory resources.

Exemplary embodiments will now be described in detail with reference to the accompanying drawings. However, the inventive concept is not limited to the exemplary embodiments. The exemplary embodiments may be modified in various forms. Thus, the exemplary embodiments are provided to explain more clearly the inventive concept to one of ordinary skilled in the art. In the accompanying drawings, like reference numerals are used to indicate like components.

The specification may refer to "an," "one," or "some" embodiment(s) in several locations. This does not necessarily imply that each reference is to the same exemplary embodiment(s), or that the feature only applies to a single exemplary embodiment. Single features of different exemplary embodiments may also be combined to provide other exemplary embodiments.

As used herein, the singular forms "a," "an," and "the" are intended to include the plural forms as well, unless expressly stated otherwise. It will be further understood that the terms "includes," "comprises," "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
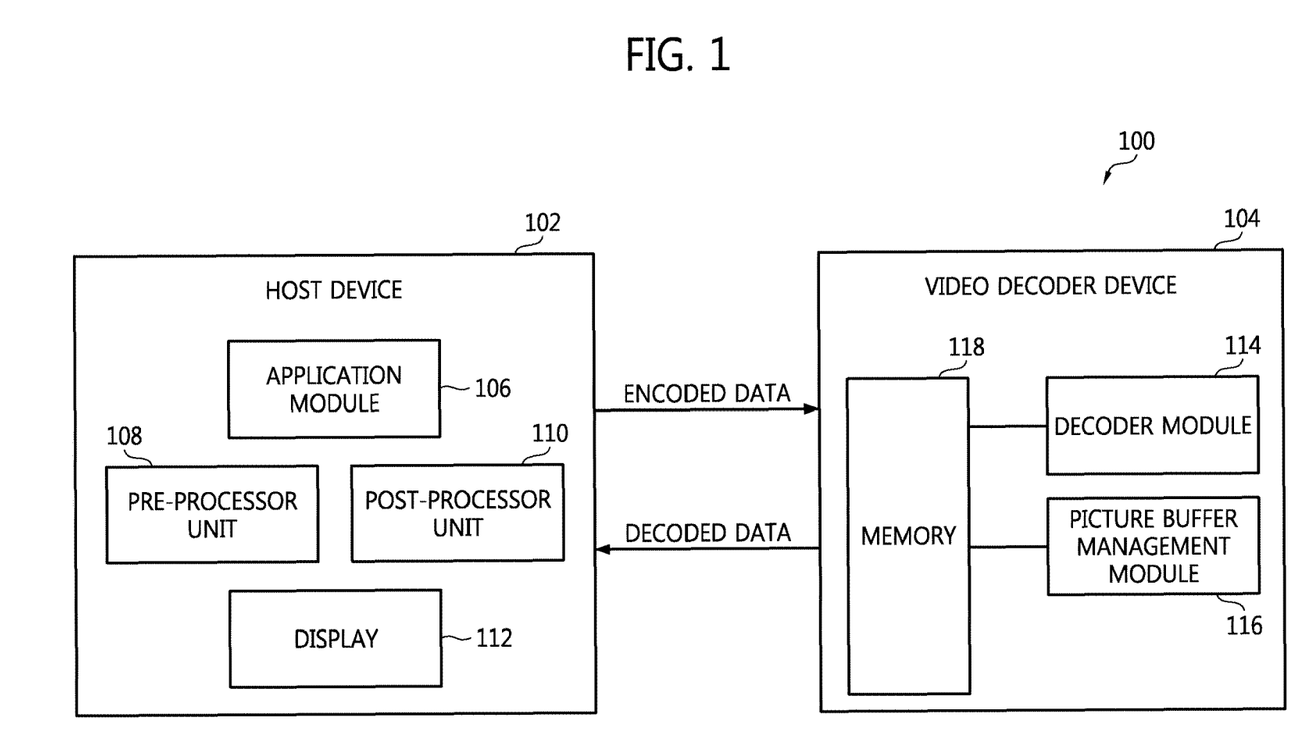
FIG. 1 is a block diagram illustrating a system for providing picture buffer management during video decoding, according to an exemplary embodiment.

FIG. 1 is a block diagram illustrating a system 100 for providing picture buffer management during video decoding, according to an exemplary embodiment. The system 100 comprises of a host device (i.e. "application device") 102, and video decoder device 104 (i.e. "decoder"). The host device 102 includes an application module 106, a pre-processor unit 108 (e.g., a pre-processor, etc.), a post-processor unit 110 (e.g., a post-processor, etc.), and a display unit 112 (e.g., a display, etc.). The decoder 104 includes a picture buffer management module 116 (e.g., a picture buffer manager, etc.), a video decoder module 114 (e.g., a video decoder, etc.) and a memory unit 118 (e.g., a memory, etc.). The host device 102 transmits encoded picture data to the video decoder device 104. The video decoder device 104 receives the encoded data and decodes the picture data to obtain decoded data. The video decoder device 104 transmits the decoded data to the host device 102 for displaying of the decoded picture data on the display unit 112.

The application module 106 checks for one or more picture buffers in a Decoder Reference Buffer (DRB) register and a Decoder Display Buffer (DDB) register received from the video decoder module. If a bit corresponding to the picture buffer is not set in the DRB register or DDB register, then the application module 106 adds the picture buffer to a free buffer list. If one or more new picture frames are present in the DDB register, then the application module 106 initiates a parallel processing application. The application module further provides information to the video decoder device about the picture buffers that are free.

The pre-processor 108 can be a processor of the host device 102 that performs processing of the pictures that are to be sent to the video decoder device 104 for decoding.

The video decoder module 114 selects a picture buffer based on information of a plurality of picture buffers received from the application module. The video decoder module 114 performs decoding of a bit stream and stores an output video data into the selected picture buffer.

The picture buffer management module 116 checks for the marking of the bit stream signals. If bit stream signals mark reference frames to non-reference frames, then the picture buffer management module 116 removes respective pictures from a reference picture list. The picture buffer management module 116 further checks at least one of a reference picture list and a display picture list. If there is a change in at least one of the reference picture list or the display picture list, then the picture buffer management module 116 updates the DRB register and the DDB register. The picture buffer management module 116 shares the updated the DRB register and the DDB register along with decoded information to the application module.

The memory unit 118 can be any storage unit that can store the pictures received by the video decoding device 104. In an exemplary embodiment, the memory unit 118 can be any internal unit, such as, but not limited to, hard disk, ROM, EEPROM, RAM, and the like, or can be any external unit, such as, but not limited to, magnetic storage device, floppy disk, CD, DVD, flash memory, other removable storage devices, and the like, or can be any storage unit connected to the video decoder device 104, such as, but not limited to, database, cloud storage, and the like, or any other storage unit, known by any person having ordinarily skilled in the art.

Figure 2:
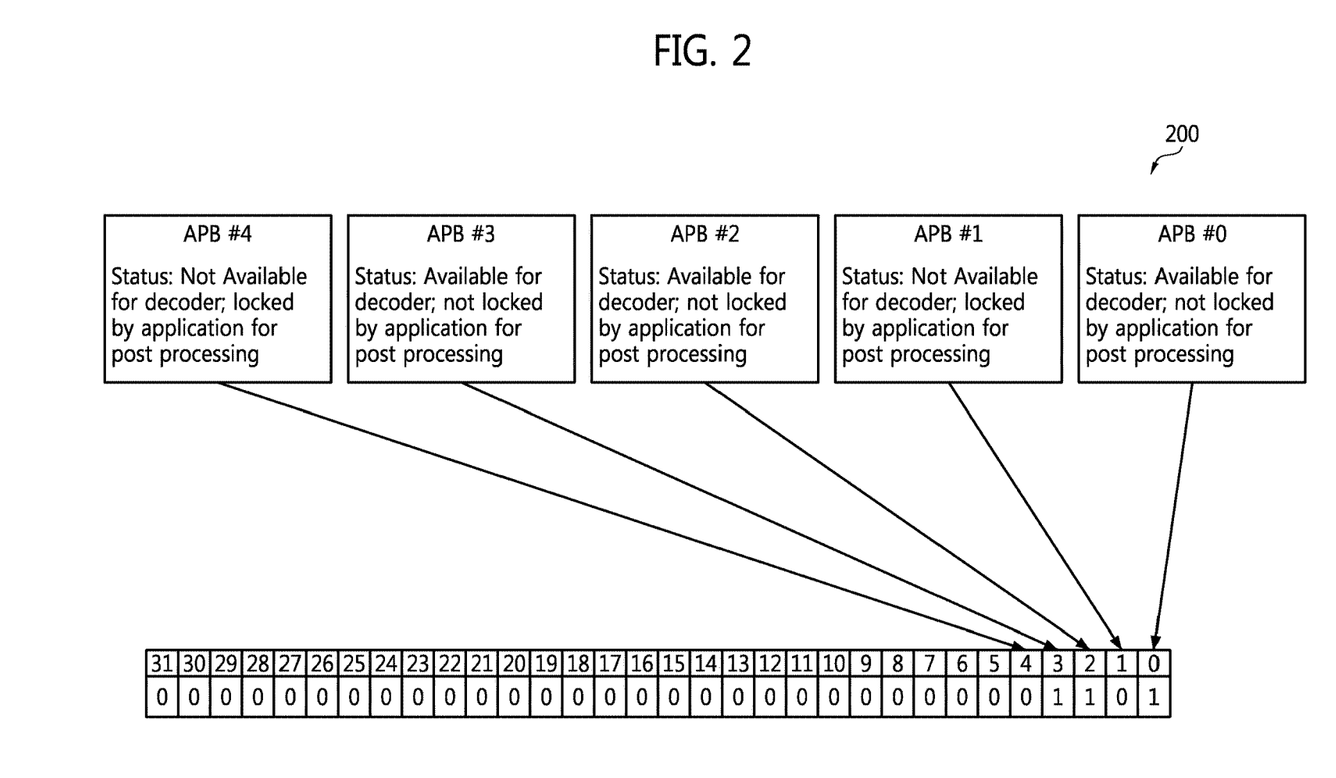
FIG. 2 is a schematic bitmap diagram illustrating an exemplary 32 bit register Available Picture Buffer (APB) register present at host device, according to an exemplary embodiment.

FIG. 2 is a schematic diagram illustrating an exemplary 32 bit Available Picture Buffer (APB) register 200, according to an exemplary embodiment. The available picture buffer (APB) can be a 32 bit register present at the host device and can communicate with a video decoder module regarding indices comprising picture buffer values freed by a host device. In another exemplary embodiment, the APB can be 64 bit, 128 bit or higher bit register. If any of the bits in the APB is set, then value 1 will be stored in the bit, and the corresponding buffer is freed by the host.

In FIG. 2, bits 0, 2 and 3 are stored with the value 1, and the remaining bits 1, 4, 5 . . . 31 are storing the value 0. The value 1 indicates a status that the decoder picture buffer (DPB) value stored in the respective bit is available for decoder and not locked by host device for post processing. The value 0 indicates a status that the DPB value stored in the respective bit is not available for decoding and is locked by the host device for post processing. Therefore, FIG. 2 indicates that only bits 0, 2, and 3 are available for decoding and not locked by the host device for post processing, whereas the remaining bits 1, 4, 5, . . . 31 are not available for decoding and locked by the host device for post processing.

Figure 3:
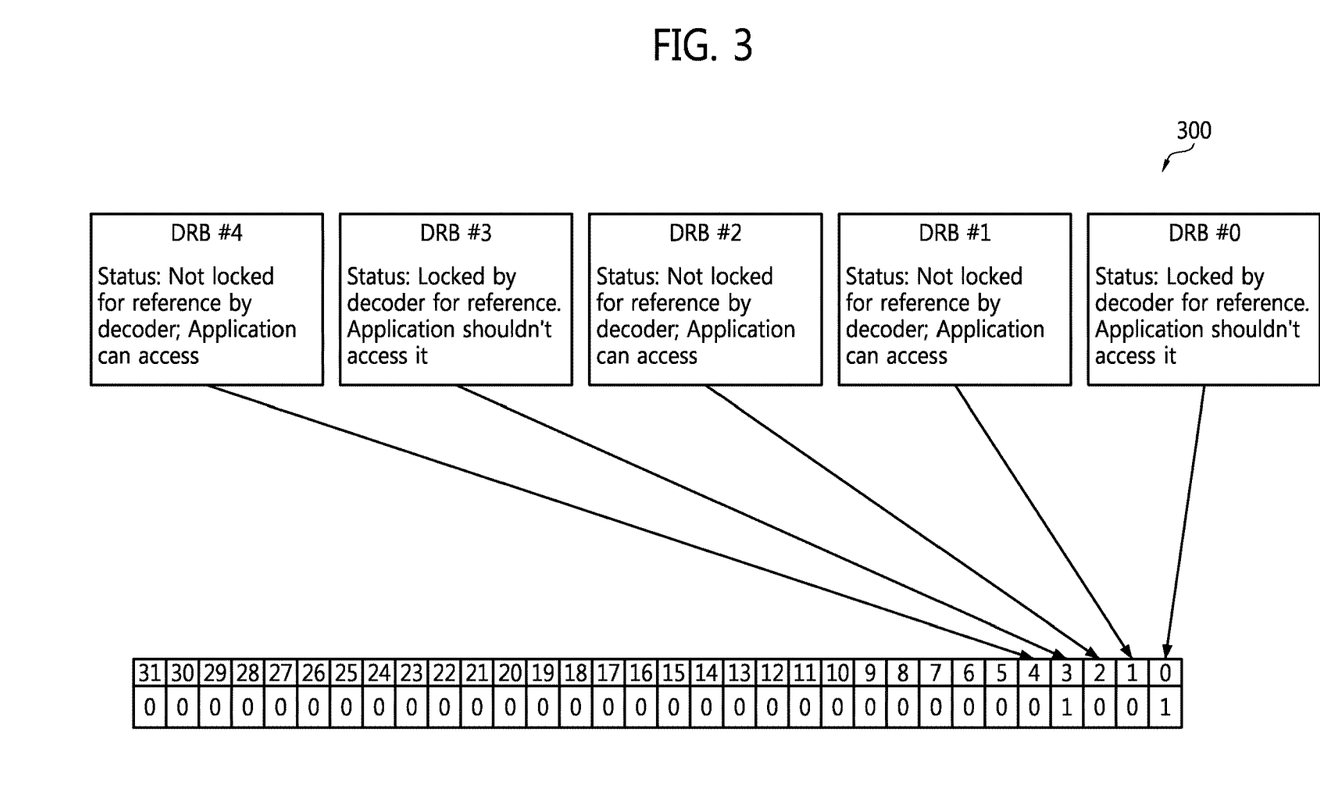
FIG. 3 is a schematic diagram illustrating a 32 bit register Decoder Reference Buffer (DRB) register, according to an exemplary embodiment.

FIG. 3 is a schematic diagram illustrating an exemplary 32 bit Decoder Reference Buffer (DRB) register 300, according to an exemplary embodiment. The decoder reference buffer (DRB) can be a 32 bit register present at the decoder and can communicate with the host device. In another exemplary embodiment, the DRB can be 64 bit, 128 bit or higher bit register. The DRB indicates the picture buffer indices locked by the decoder in the DRB. The host device can use the indices to determine whether the application may or may not access the corresponding picture buffer. If any bit is set in the DRB, then the corresponding buffer is locked for reference by the decoder.

In the FIG. 3, bits 0 and 3 are stored with the value 1, and the remaining bits 1, 2, 4, 5 . . . 31 are storing the value 0. The value 1 indicates a status that the decoder picture buffer (DPB) value stored in the respective bit is locked by the decoder for reference and the host device should not access it. The value 0 indicates a status that the DPB value stored in the respective bit is not locked by the decoder for reference and the host device can access the bit. Therefore, FIG. 3 indicates that only bits 0 and 3 are locked by the decoder for reference and the host device should not access them, whereas the remaining bits 1, 2, 4, 5, . . . 31 are not locked by the decoder for reference and the host device can access the bit(s).

Figure 4:
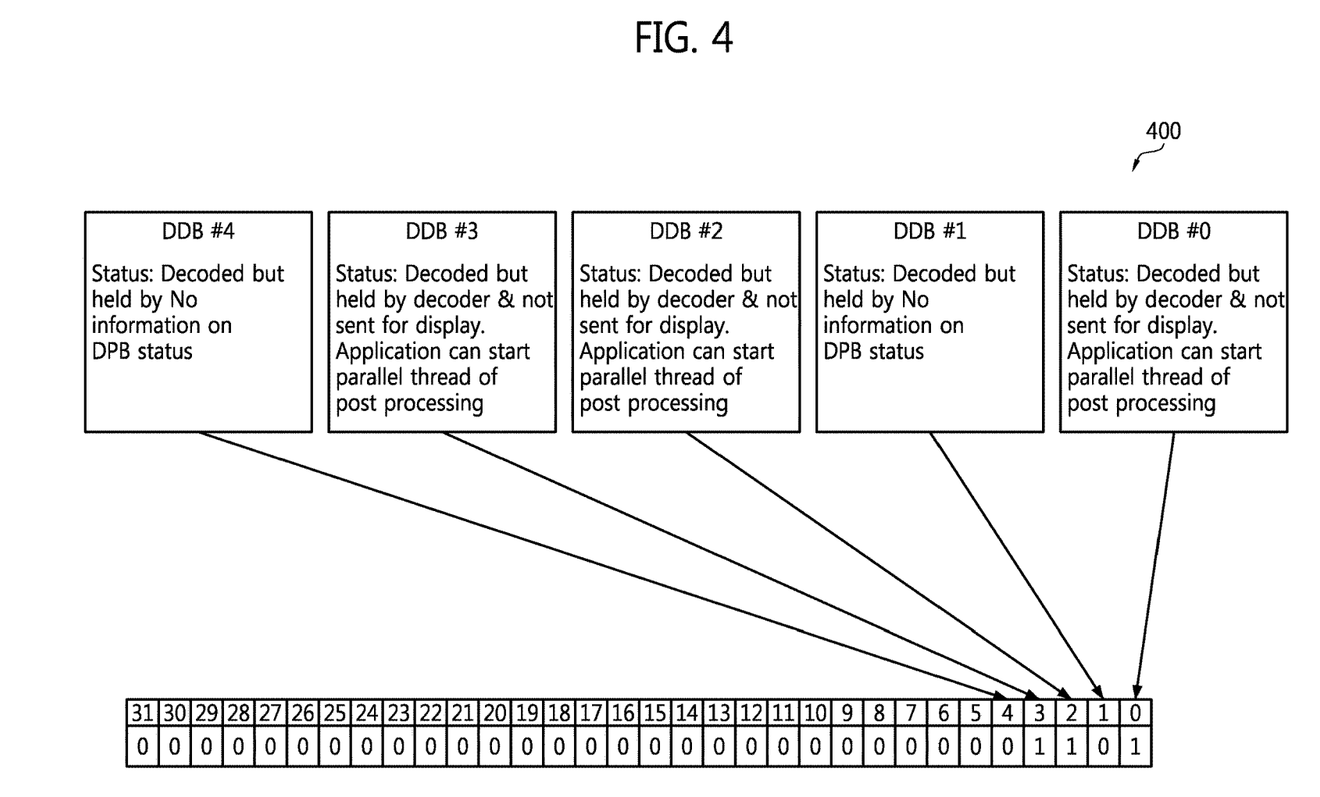
FIG. 4 is a schematic diagram illustrating a 32 bit register Decoder Display Buffer (DDB) register, according to an exemplary embodiment.

FIG. 4 is a schematic diagram illustrating an exemplary 32 bit register Decoder Display Buffer (DDB) 400, according to an exemplary embodiment. The DDB can be a 32 bit register present at decoder and can communicate with the host device. In another exemplary embodiment, the DDB can be 64 bit, 128 bit or higher bit register. The DDB can indicate to the host device the picture buffers indices locked by the decoder. If any bit is set in the DDB, then the corresponding buffer status is decoded but not sent for display by the decoder.

In FIG. 4, bits 0, 2 and 3 are stored with the value 1, and the remaining bits 1, 4, 5 . . . 31 are storing the value 0. The value 1 indicates a status that a value stored in the respective bit is decoded but held by the decoder for reference, but not sent for display and the host device can start parallel thread of post processing. The value 0 indicates no information is stored regarding the DPB status. Therefore, the FIG. 4 2 indicates that only bits 0, 2, and 3 are decoded and held by the decoder for reference, but not sent for display and the host device can start a parallel thread of post processing, whereas the remaining bits 1, 2, 4, 5, . . . 31 do not have any information stored regarding the DPB status.

Figure 5:
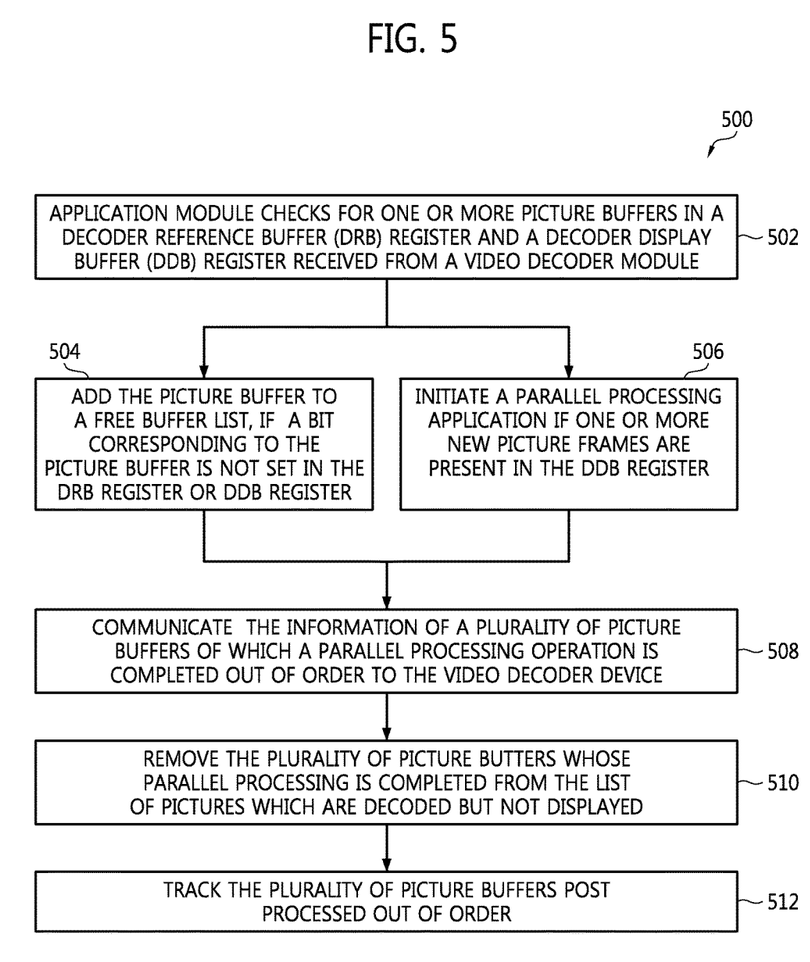
FIG. 5 is a flow diagram illustrating the method of operation of the host device, according to an exemplary embodiment.

FIG. 5 is a schematic flow diagram 500 illustrating a method for optimal buffer management at a host device, according to an exemplary embodiment. According to the method, at operation 502, the application module of a host device checks one or more picture buffers in a Decoder Reference Buffer (DRB) register and a decoder display buffer (DDB) register received from a video decoder module. At operation 504, the host device adds a picture buffer to a free buffer list in response to determining that the decoder is not using the picture buffer and is free if the picture buffer is not set in the DRB register or the DDB register. The free picture buffer can be used when the host device requires the picture buffer for image storage. At operation 506, parallel operations such as post processing are initiated by the host if one or more new picture frames are present in the DDB register. The picture buffers present in the DDB and not present in the DRB can be reused for post processing, i.e. the same buffer can be reused as an output of post processing. Parallel processing without reusing picture buffers is performed for pictures in DDB which are part of DRB, as the host is mandated to preserve reference frames used by the decoder.

At operation 508, the host device identifies the status of the DRB register and the DDB register, initiates appropriate operations such as post processing, and communicates to the decoder the picture buffers that are free through the APB register, other information needed for decoding, and can initiate the decoding of the pictures. If the host device receives any response from the decoder, then the host device again starts checking the DRB and the DDB. At operation 510, the plurality of picture butters whose parallel processing is completed are removed from the list of pictures which are decoded but not displayed. At operation 512, the plurality of picture buffers that are post processed out of order are tracked.

Figure 6:
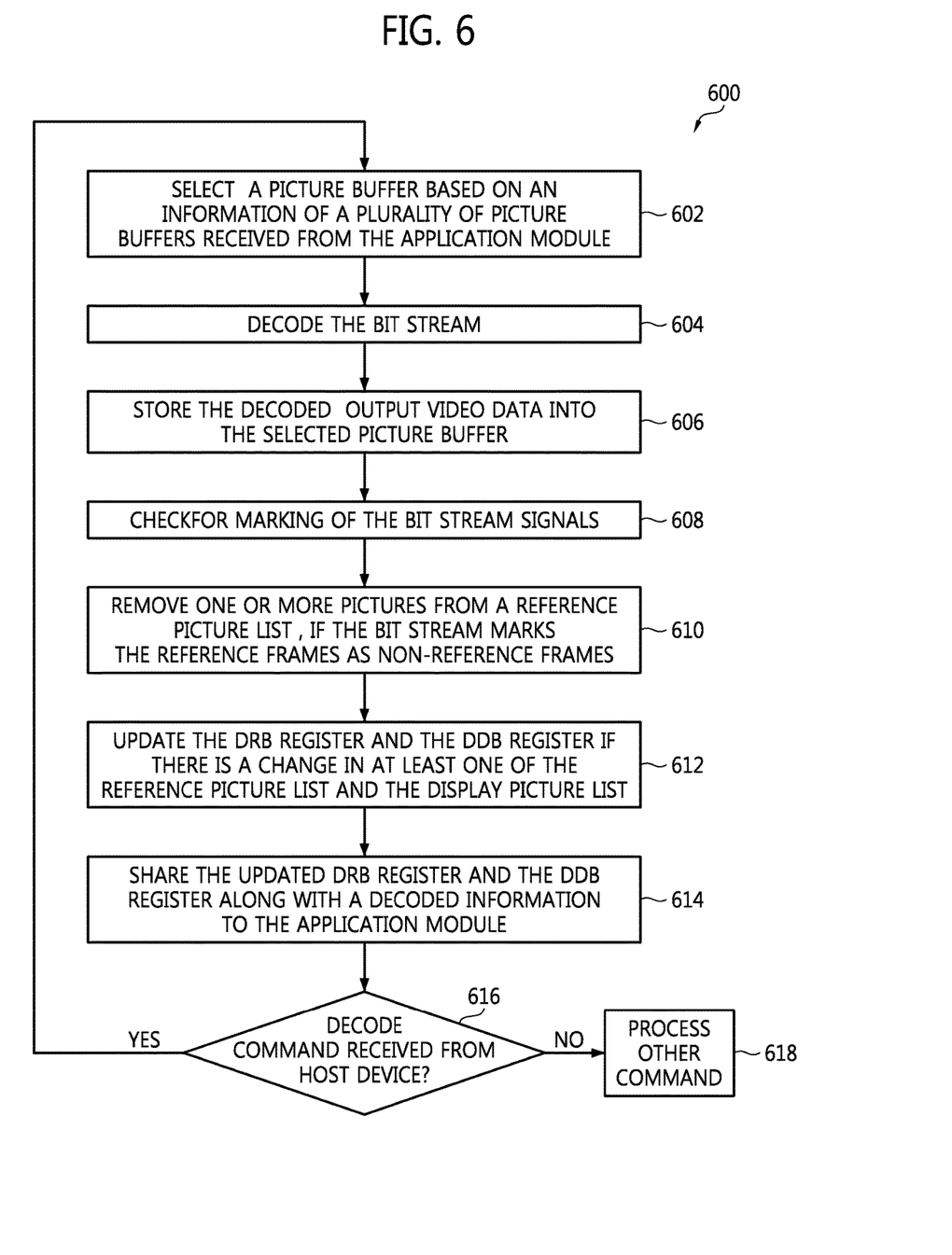
FIG. 6 is a flow diagram illustrating a method for providing picture buffer management during video decoding, according to an exemplary embodiment.

FIG. 6 is a schematic flow diagram 600 illustrating a method for optimal buffer management at decoder, according to an exemplary embodiment. According to the method, at operation 602, the decoder selects a picture buffer based on information of a plurality of picture buffers received from the application module or host device. At operation 604, the decoder decodes a bit stream of a video stream, upon picking the picture buffer. At operation 606, the decoder stores an output video into the picture buffer which was picked by the decoder. At operation 608, the decoder checks the marking of the bit stream signals. The picture buffer management module 116 checks the marking of the bit stream signals. If the bit stream signals mark reference frames to non-reference frames, then the decoder removes respective pictures from a reference picture list at operation 610.

The decoder has a reference picture list. The decoder considers one of the pictures from the list as a reference picture and compares other pictures with the reference picture. The decoder checks if the reference picture list and the display picture list are the same. If the picture buffers stored in the reference picture list and the display picture list are same, then the process is terminated. If there is a change in the reference picture list and the display picture list, then the process moves to operation 612.

In operation 612, the decoder updates the DRB register and the DDB register based on the updated picture list. The decoder continues decoding the entire bit stream data until the entire picture is decoded. At operation 614, the updated DRB and DDB registers and other decoded information are shared with the host device or application module.

Once decoding of a picture is completed, and the decoder waits for next host command, at operation 616, the decoder checks if a "decode" command is received from the host device. If a "decode" command is not received from the host device, then the decoder moves to operation 618, and processes other commands. If a decode command is received from the host device, then the decoder moves to operation 602, and decoding process begins again as discussed herein above in the flowchart.

The various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as a general or special purpose processor or an application specific integrated circuit.

While one or more exemplary embodiments have been described with reference to the figures, it will be understood by those of ordinary skill in the art that various changes in form and details may be made therein without departing from the spirit and scope as defined by the following claims.

We claim:

1. A method of video decoding, the method comprising:
checking, by an application module, one or more picture buffers in a Decoder Reference Buffer (DRB) register and a Decoder Display Buffer (DDB) register received from a video decoder module;
initiating at least one action based on a status of the one or more picture buffers;
providing, by the application module to a video decoder module, information on at least one of the one or more picture buffers that is free;
selecting, by the video decoder module, a first picture buffer based on the information on the at least one of the one more picture buffers received from the application module;
decoding a bit stream by using the first picture buffer; and
storing output video data from the decoding into the first picture buffer; checking markings of the bit stream; removing one or more pictures from a reference picture list and moving the one or more pictures to a display picture list, if the markings of the bit stream mark reference frames as non-reference frames; checking at least one of the reference picture list and the display picture list; updating the DRB register and the DDB register if there is a change in a marking of at least one of the reference picture list and the display picture list; and after the updating, sharing the DRB register, the DDB register, and decoded information with the application module.

2. The method of claim 1, wherein the initiating the at least one action based on the status of the one or more picture buffers comprises:
adding a picture buffer of the one or more picture buffers to a free buffer list, if a bit corresponding to the picture buffer is not set in the DRB register or DDB register.

3. The method of claim 1, wherein the initiating the at least one action based on the status of the one or more picture buffers comprises:
initiating a parallel processing application if one or more new picture frames are present in the DDB register.

4. The method of claim 1, further comprising:
communicating, by the application module, the information on at least one of the one or more picture buffers, in which a parallel processing operation is completed out of order, to the video decoder module through an Available Picture Buffer (APB) register;
removing the at least one of the one or more picture buffers whose parallel processing is completed out of order from a reference picture list of pictures which are decoded but not displayed;
tracking the at least one of the one or more picture buffers whose parallel processing is completed out of order; and
sending the at least one of the one or more picture buffers whose parallel processing is completed out of order to a display when the video decoder module signals the at least one of the one or more picture buffers whose parallel processing is completed out of order.

5. The method of claim 1, wherein the checking the one or more picture buffers comprises:
determining if at least one bit corresponding to a second picture buffer of the one or more picture buffers is set in the DRB register or DDB register; and
in response to determining that the at least one bit corresponding to the second picture buffer of the one or more picture buffers is not set in the DRB register or the DDB register, adding the second picture buffer to a free buffer list.

6. The method of claim 5, wherein the checking the one or more picture buffers further comprises:
determining if a new frame is added to the DDB register; and
in response to determining that the new frame is added to the DDB register, initiating a parallel processing operation.

7. The method of claim 6, wherein the parallel processing operation comprises post processing the new frame in response to determining that, the new frame is added to the DDB register and is not present in the DRB register, the method further comprising:
storing an output of the post processing in a buffer where the new frame is present.

8. The method of claim 1, wherein the DRB register is configured to indicate second picture buffers that are locked by the video decoder module to the application module, and
wherein if a bit is set in the DRB register, a corresponding buffer is locked for reference by the video decoder module.

9. The method of claim 1, wherein the DDB register is configured to indicate second picture buffers that are locked by the video decoder module to the application module, and
wherein a set status of a bit in the DDB register indicates that a corresponding picture buffer is decoded but not provided to a display list.

10. A system for providing video decoding, the system comprising:
a host device comprising:
an application module configured to check one or more picture buffers in a Decoder Reference Buffer (DRB) register and a Decoder Display Buffer (DDB) register received from a video decoder module, initiate at least one action based on a status of the one or more picture buffers, provide information on at least one of the one or more picture buffers that is free to the video decoder module; and
a video decoder device comprising:
a video decoder module configured to select a first picture buffer based on the information of the at least one of the one more picture buffers received from the application module and decode a bit stream by using the first picture buffer; a picture buffer management module configured to check markings of the bit stream, remove one or more pictures from a reference picture list and move the one or more pictures to a display picture list, if the markings of the bit stream mark reference frames as non-reference frames, check at least one of the reference picture list and the display picture list, update the DRB register and the DDB register if there is a change in a marking of at least one of the reference picture list and the display picture list, and after the DRB register and the DDB register are updated, share the DRB register, the DDB register, and decoded information with the application module.

11. The system of claim 10, wherein the application module is further configured to initiate the at least one action based on the status of the one or more picture buffers by
adding a second picture buffer of the one or more picture buffers to a free buffer list, if a bit corresponding to the second picture buffer is not set in the DRB register or DDB register; and
initiating a parallel processing application if one or more new picture frames are present in the DDB register.

12. The system of claim 10, wherein the video decoder module is further configured to:
after the bit stream is decoded, store output video data from the decoded bit stream into the first picture buffer.

13. The system of claim 10, wherein the application module is further configured to:
communicate the information on at least one of the one or more picture buffers, in which a parallel processing operation is completed out of order, to the video decoder module through an Available Picture Buffer (APB) register;
remove at least one of the one or more picture buffers whose parallel processing is completed out of order from a reference picture list of pictures which are decoded but not displayed;
track the at least one of the one or more picture buffers whose parallel processing is completed out of order; and
send the at least one of the one or more picture buffers whose parallel processing is completed out of order to a display when the video decoder module signals the at least one of the one or more picture buffers whose parallel processing is completed out of order.

14. The system of claim 10, wherein the application module is further configured to:
determine if at least one bit corresponding to a second picture buffer of the one or more picture buffers is set in the DRB register or DDB register;
in response to determining that the at least one bit corresponding to the second picture buffer of the one or more picture buffers is not set in the DRB register or the DDB register, add the second picture buffer to a free buffer list;
determine if a new frame is added to the DDB register; and
in response to determining that the new frame is added to the DDB register, initiate a parallel processing operation.

15. The system of claim 14, wherein the parallel processing operation comprises post processing the new frame in response to determining the new frame is added to the DDB register and is not present in the DRB register, and
wherein the application module is further configured to store an output of the post processing in a buffer where the new frame is present.

16. The system of claim 10, wherein the DRB register is configured to indicate second picture buffers that are locked by the video decoder module to the application module, and
wherein if a bit is set in the DRB register, a corresponding picture buffer status is locked for reference by the video decoder module.

17. The system of claim 10, wherein the DDB register is configured to indicate second picture buffers that are locked by the video decoder module to the application module, and
wherein a set status of a bit in the DDB register indicates that a corresponding picture buffer is decoded but not provided to a display list.

* * * * *